Feb. 8, 1949.  G. C. SOUTHWORTH  2,461,005
ULTRA-HIGH FREQUENCY TRANSMISSION
Filed April 5, 1940  6 Sheets-Sheet 1

INVENTOR
G.C. SOUTHWORTH
BY
N. A. Ewing
ATTORNEY

Feb. 8, 1949.   G. C. SOUTHWORTH   2,461,005
ULTRA-HIGH FREQUENCY TRANSMISSION
Filed April 5, 1940   6 Sheets—Sheet 2

INVENTOR
G. C. SOUTHWORTH
BY
*N. S. Ewing*
ATTORNEY

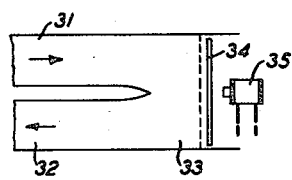
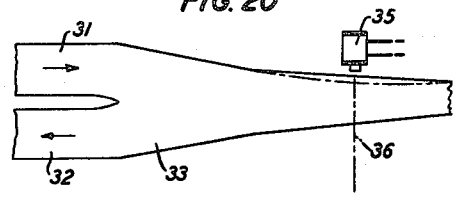
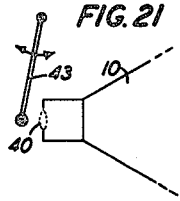
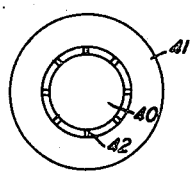
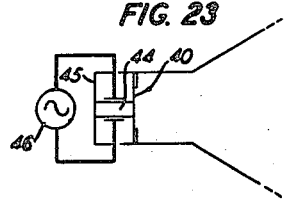
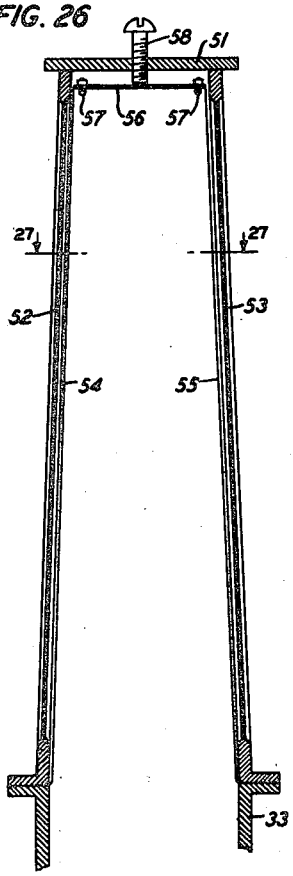
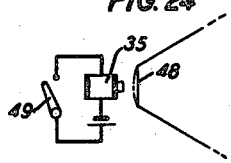
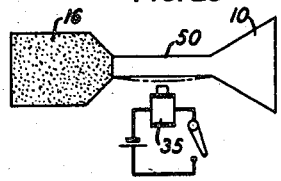
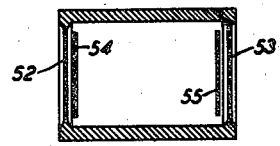
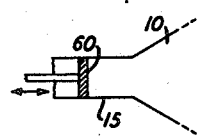
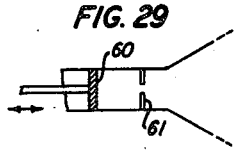
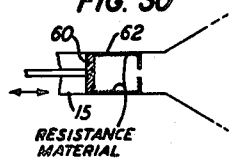

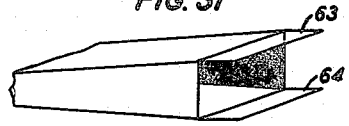
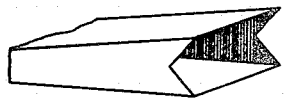
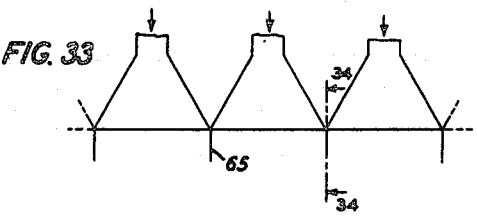
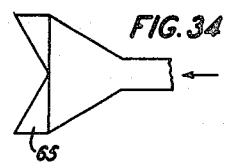
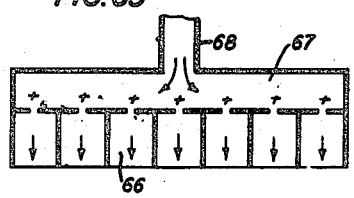
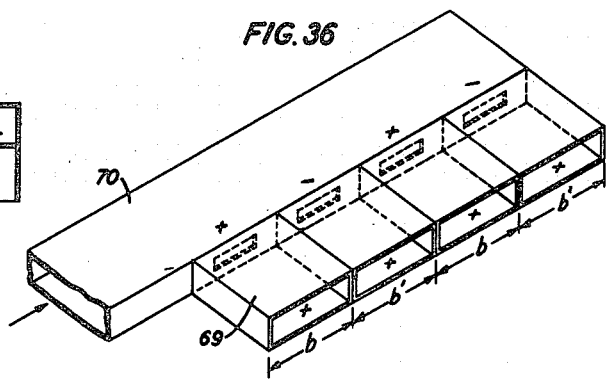
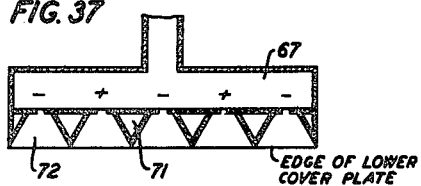
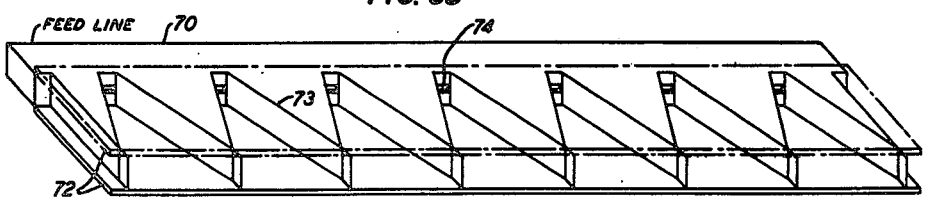

Feb. 8, 1949.    G. C. SOUTHWORTH    2,461,005
ULTRA-HIGH FREQUENCY TRANSMISSION
Filed April 5, 1940    6 Sheets-Sheet 5

INVENTOR
G. C. SOUTHWORTH
BY
N. D. Ewing
ATTORNEY

Feb. 8, 1949.  G. C. SOUTHWORTH  2,461,005
ULTRA-HIGH FREQUENCY TRANSMISSION

Filed April 5, 1940  6 Sheets-Sheet 6

INVENTOR
G. C. SOUTHWORTH
BY
N. D. Ewing
ATTORNEY

Patented Feb. 8, 1949

2,461,005

UNITED STATES PATENT OFFICE 2,461,005

ULTRA HIGH FREQUENCY TRANSMISSION

George C. Southworth, Red Bank, N. J., assignor to Bell Telephone Laboratories, Incorporated, New York, N. Y., a corporation of New York Application April 5, 1940, Serial No. 327,988

12 Claims. (Cl. 343—5)

This invention relates to ultra-high frequency radio systems and more particularly to systems utilizing radio wave reflectors in their operation.

A principal object of the invention is to provide an improved device for the efficient reflection of radio waves incident upon it and to obtain improved directional reflective effects therefrom.

Another object is to provide reflectors having varied reflection characteristics such as to distinguish the several reflectors by their respective effects on the radio waves applied to them. A specific object of the invention is to provide an improved system for the marking of channels and routes for watercraft, aircraft and other vehicles.

In accordance with the present invention the foregoing objects and various other objects that will appear hereinafter are achieved by use of the electromagnetic horn. Applicant has discovered that the electromagnetic horn, heretofore proposed as a device for the directive or beam transmission of ultra-high frequency radio waves and for the reception of such waves, has the property, when it is properly terminated, of reflecting back to its source any radio wave incident upon it from a direction lying within its angular range of transmission and reception. The directional characteristics of the horn are such that the incident energy is efficiently collected and retransmitted with directional effects depending upon the directional characteristics it has as a normal radiator or receiver. The usual dispersive effects of plane reflectors are thereby avoided to a substantial degree.

In one typical embodiment of the invention, a water course is outlined by radio reflectors of the kind described, placed at strategic points along its margins. A ship traversing that course is provided with radio beam transmitter-receiver apparatus so arranged that the course can be "scanned" with a radio beam from the transmitter and an indication obtained from the receiver when the beam strikes a reflector. The observed orientation of the several reflectors so detected can then be interpreted by the navigator to aid him in guiding the ship.

Other features of the invention enable the several reflectors to be identified or distinguished by operation on the radio waves received or returned by the reflectors. In accordance with one of such features, the reflection-frequency characteristics of the several reflectors are made unlike so that by analyzing the amplitude-frequency characteristic of the waves returned to the ship, the navigator can identify the particular reflector toward which the radio beam is then directed. Thus the reflector can be made to exhibit highpass, low-pass, band-pass, band-rejection and like characteristics or combinations of them. This feature requires that the scanning beam comprise a plurality of different frequencies transmitted simultaneously or successively. In accordance with another modification, an incident wave of a given frequency gives rise to a reflected wave of varying frequency or phase so that the reflector can be identified by the characteristic frequency or phase modulation it produces. Other features of the invention lie in specific means for introducing characteristic amplitude modulation of the reflected waves. Still other features of the invention reside in the apparatus provided for launching and receiving the radio waves, as will appear hereinafter.

The nature of the present invention and its various objects, features and advantages will appear more fully in the following description of the various illustrative embodiments shown in the accompanying drawings.

In the drawings:

Figs. 19 to 30 show other modifications of the invention adapted for amplitude or frequency modulation of an incident wave;

Figs. 31 to 42 show improved types of horns and arrays for launching and receiving the scanning beam;

Figure 1:
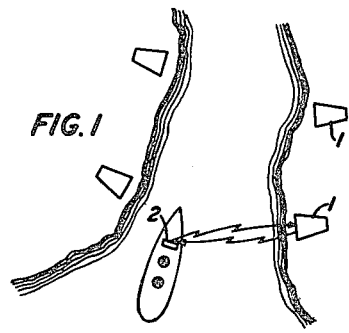
Fig. 1 illustrates diagrammatically a channel marking system utilizing radio wave reflectors.

Referring now to Fig. 1 there is illustrated a typical embodiment of the invention hereinbefore described in which a plurality of radio wave reflectors 1 are spaced apart along the margin of a water course to facilitate navigation of a ship through the course when the shore is obscured as by fog or darkness. The ship is provided with radio equipment 2 adapted to determine the angular bearings of the successively encountered reflectors, thereby enabling the navigator to calculate the position of the ship, and additional means and methods may be employed as hereinafter to be described for identifying and distinguishing the several reflectors.

Figure 2:
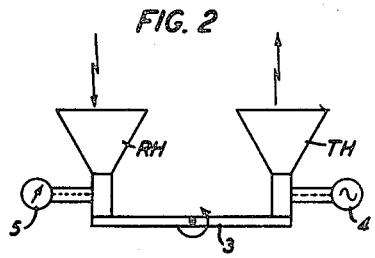
Fig. 2 represents typical radio apparatus appropriate for use on the craft to be guided.

Fig. 2 shows in schematic outline one particular form that the radio apparatus on the ship may take. A "transmitting" horn TH, mounted at one end of a cross-bar 3 that is rotatable about a vertical shaft, is connected in operative relation with a source 4 of ultra-high frequency oscillations so that electro-magnetic waves are radiated through the mouth of the horn into space preferably with the wave energy largely concentrated along the axis of the horn extended. This, in other words, is preferably a radio beam transmitter. Mounted at the other end of the cross-bar is a "receiving" horn RH that is aimed in the same direction as the transmitting horn and that is operatively connected to a receiver, detector or indicator 5. The horn RH is preferably one having a sharp directivity pattern aligned with the axis of the horn extended. On slow rotation of the cross-bar, the radio beam emanating from the horn TH sweeps over the water and scans the surroundings. When the beam strikes one of the reflectors 1 along the shore, it is reflected back toward its source whereupon it enters the receiving horn RH and its presence is detected by the device 5. The angular bearing of the reflector is then indicated directly by the orientation of the horns.

Figure 3:
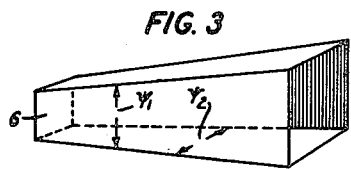
Fig. 3 shows a preferred form of radio wave reflector in accordance with the invention.

An important feature of the present invention lies in the discovery and application of the fact that the metallic horn can constitute an excellent reflector well adapted for use in a system of the kind described with reference to Figs. 1 and 2. An illustrative example of such a horn-type reflector is represented in Fig. 3. The specific kind depicted is of rectangular cross-section having four planar metallic sides, one or the other or both pairs of opposite sides flaring at an angle $\psi_1$, $\psi_2$, with respect to each other and symmetrically with reference to the principal axis of the horn. The smaller or throat end of the horn is closed by a reflector in the form of a rectangular metallic plate 6 that is normal to the horn axis.

Figure 4:
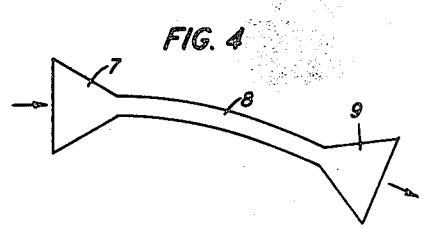
Figs. 4 and 5 are diagrams to which reference will be made in discussing the characteristics of the Fig. 3 reflector.
Figure 5:
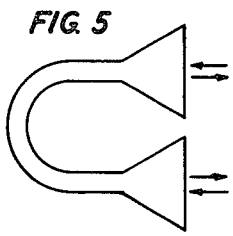

Heretofore the metallic horn has been known only as a wave transducer, that is, as a device for efficiently collecting radio wave power and converting it into a form suitable for application to a receiver, wire line or hollow pipe guide, or for the converse function of launching radio waves into space. Thus in Fig. 4, for example, a horn 7 may be used to receive radio waves from a distant beam transmitter and to convert them into guided waves in a hollow pipe guide 8 that is connected to the throat end of the horn as a continuation thereof. A horn 9 may be similarly connected to the other end of the guide, so that the wave power intercepted by horn 7 may be efficiently relayed, with or without amplification in the guide 8, or redirected as for example from the top of a mountain or other obstruction to receiving stations beyond and below the incident beam. It is known too that such horns may be varied as to cross-sectional shape; they may be, for example, of rectangular, circular or elliptical cross-section, and that the rate of flare may be linear as in a conical or pyramidal horn or follow some other law relating manner of flare to length. It is further known that the directivity pattern of a horn depends on its dimensions or parameters and on the operating frequency and that the horn can be so proportioned as to produce, for example, either high axial gain or approximately uniform gain over a wide angle. All of these various modifications of horn transducers are susceptible of application to the purposes of the present invention for all that is necessary in each case is to so terminate the horn that instead of impedance matching there is a marked impedance discontinuity at or near the throat of the horn so that incident wave power is in large measure reflected at the point of discontinuity and radiated out through the mouth of the horn. Another possible modification that may be noted is shown in Fig. 5, where the throats of two like-directed horns are connected by a hollow pipe guide as described with reference to Fig. 4. Wave power intercepted by either of these horns is returned in the direction from which it arrives by radiation from the other horn, and the combination may function as a double horn reflector much as it would if the connecting guide were blocked off at its mid-point by a reflecting barrier.

One of the principal objects of the invention is to provide for identification of the several reflectors in a system such as described with reference to Fig. 1 so that the navigator of the craft, whether it be a ship or aircraft, for example, can readily distinguish between them. The metallic horn type of reflector lends itself especially well to various means and methods of identification as will appear from the following description of a number of illustrative embodiments of this phase of the present invention. All of these embodiments involve some distinctive operation on the radio waves whereby, in a broad sense at least, an identifying characteristic may be said to be impressed on the reflected waves at the point of reflection.

Figs. 6 to 12 illustrate embodiments of the invention wherein frequency selective absorption or reflection at the reflector is utilized. In these embodiments it is contemplated that the scanning beam shall comprise a plurality of frequencies that may be transmitted successively or simultaneously and that the receiver shall be one adapted to analyze the beam received after reflection, or otherwise adapted to compare it with the frequency composition of the transmitted beam so that the frequencies that have been selectively absorbed or reflected at the reflector can be determined. The transmitter in this case may comprise an oscillation generator the frequency of which can be continuously varied over the frequency range of interest, and the receiver may comprise a device indicating the relative amplitudes of the received waves at the various transmitted frequencies. The observed response of the receiver may then be compared with the previously determined response obtaining when the beam is reflected from a non-selective reflector. This latter procedure may be desirable if the frequencies in the scanning beam occupy a wider frequency range than that over which the reflection-frequency characteristic of the reflector is substantially flat.

Figure 6:
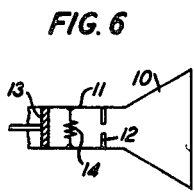
Figs. 6 to 12 illustrate schematically various embodiments of the invention utilizing frequency-selective reflection and absorption properties to identify the reflectors.

In Fig. 6 the reflector comprises a horn 10 which may take any of the forms mentioned hereinbefore. To the throat end of the horn is connected a chamber comprising a pipe-like extension 11 of the horn, a metallic iris diaphragm 12, and a metallic piston reflector 13. The chamber is resonant at some frequency, determined by its proportions, that is within the operating frequency range of the beam transmitter. Within the chamber is a power dissipator 14 which is represented as comprising a resistor interposed in a transverse conductor although there are a variety of other absorber structures that may be used equally well. In accordance with the teachings of such prior art as United States Patent No. 2,151,118, issued March 21, 1939, to A. P. King et al., the various parameters of the chamber can be so correlated that substantially all of the wave power of a given frequency incident on the iris diaphragm enters the chamber and is absorbed, or in other words, there may be obtained at a given frequency an impedance match between the throat end of the horn and the chamber. At frequencies above and below the given frequency there is an impedance mismatch and hence reflection of the incident beam. Thus, if the scanning beam is progressively varied from one end of the operating frequency range to the other, a frequency is reached, more or less sharply defined depending on the adjustment of the chamber, where the received reflected wave drops to a minimum or zero value. On thus determining the absorption frequency of the particular reflector, reference may be made to charts or maps, for example, to ascertain the location of the reflector having that assigned absorption frequency. Other reflector markers in the vicinity are assigned different respective absorption frequencies so that they can be identified in the same manner. The several reflectors may be so designed that all of them are reflective at a common frequency, whereby that frequency may be employed for the initial operation of detecting the reflectors prior to identification in the manner described.

Figure 7:
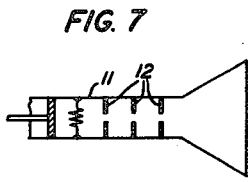

In the modification of Fig. 6 that is illustrated in Fig. 7, the chamber comprises an elongated pipe section 11 accommodating several iris diaphragms 12 which are spaced apart in known manner to constitute a band-pass filter. This arrangement can be used to provide a narrower or more sharply defined absorptive frequency range than is possible in Fig. 6, or it can be used to absorb a wider band of frequencies. In the latter case, the several reflector markers may be assigned absorptive bands of the same mean frequency but of different widths, the width of the band absorbed then serving to identify the particular reflector.

Figure 8:
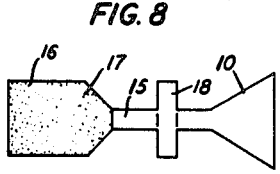

Whereas Figs. 6 and 7 may be said to involve frequency selective absorption, the modification shown in Fig. 8 involves frequency-selective reflection in that it permits absorption of all incident wave power in the operating frequency range excepting at a preassigned frequency or band of frequencies for which it is purely reflective. In this case the horn 10 has coupled to its throat a section of metallic pipe guide 15 that leads to a metallically bounded chamber 16 containing power absorbing material 17 designed to absorb all wave power entering the chamber. Although there are a variety of suitable absorbing materials having a low dielectric constant and a high power loss coefficient, such as loose cotton or glass wool moistened with water, best results have been obtained with glass wool coated with colloidal carbon to a medium or light gray. For operating frequencies of the order of 3,000 megacycles, the guide 15 may be, for example, 7.3 centimeters in diameter and 30 centimeters long and expand at a moderate rate of flare into a chamber 16 that is 15 centimeters in diameter and 50 centimeters long. As a refinement in the design of the absorber chamber the density of the colloidal carbon coating may be progressively increased from the right-hand end of the chamber to the other end.

Interposed in the pipe guide 15 in Fig. 8 is a reactance element 18 that may be considered as comprising a short section of pipe having a diameter substantially larger than that of the pipe guide 15 and coaxial therewith. The chamber thus formed is made resonant by appropriate proportioning at some frequency within the operating frequency range, so that it virtually short-circuits the pipe guide 15 in so far as incoming waves of the resonant frequency are concerned. Such incoming waves are therefore not admitted to the absorbing chamber 16 but are reflected back through the horn, and the frequency at which the combination acts as a reflector rather than as an absorber serves to identify the particular reflector.

Figure 9:
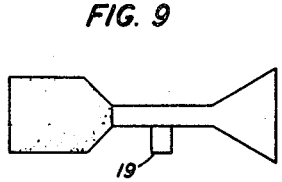

In lieu of the resonant coaxial chamber 18, a lateral stub pipe or branch chamber 19 can be utilized as illustrated in Fig. 9. Further details as to the construction and manner of operation of frequency selective devices, such as 18 and 19, will be found in my United States patent, No. 2,106,768, issued February 1, 1938.

Figure 10:
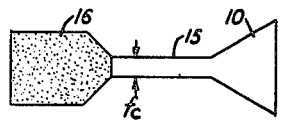

Still another characteristic of wave guide systems is utilized in the embodiment of the invention illustrated in Fig. 10. Here the horn 10 is connected by a metallic pipe guide 15 to a power absorbing chamber 16, as described with reference to Figs. 8 and 9, but instead of a reactive device interposed in the guide, the guide itself is so proportioned as to exhibit frequency-selective properties. More particularly, the transverse dimensions of the guide, or the diameter specifically in the case of a guide of circular cross-section, is such that the transmission cut-off frequency of the guide falls within the operating frequency range. It is well known that the transmission cut-off frequency depends on the transverse dimensions of the guide and that it can be calculated from published data, quite readily for guides of simple cross-sectional configuration. Incoming waves having a frequency above the cut-off frequency are freely transmitted to the chamber 16 and there absorbed. Waves of any lower frequency are rejected by the guide and are accordingly reflected through the horn. Thus by assigning respectively different transmission cut-off frequencies to the various guides 15 comprising a system as in Fig. 1, the several reflectors can be identified and distinguished by their respective frequency-reflection characteristics.

Figure 11:
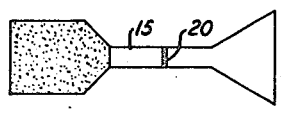
Figure 12:
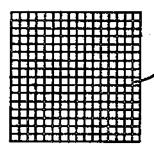

Transmission cut-off properties are utilized in the frequency-selective embodiment of the invention illustrated in Fig. 11. The structural arrangement and general proportions in this example may be the same as in Figs. 8 and 9; the frequency-selective function is introduced by the multiply-apertured metallic barrier 20 interposed in the metallic pipe guide 15 and shown in greater detail in Fig. 12. If radio waves are incident on the face of a metallic plate of substantial thickness having a large number of apertures therein, the apertures may serve as miniature wave guides and freely transmit from one face of the plate to the other all of the incident waves having a frequency higher than a critical frequency determined by the dimensions of the apertures. If the apertures are, for specific example, of square cross-section, they will transmit all waves of normal polarization that have a free space wave-length equal to or less than one-half either cross-sectional dimension, and even longer waves if the thickness of the plate and therefore the length of the miniature guides is not great enough to develop fully the transmission cut-off characteristic of a long guide. Such waves as are not thus transmitted through the apertures are reflected. Hence, the plate exhibits transmission and reflection characteristis that are selective with respect to frequency and it can be used generally for separating waves of different frequencies.

In the example of practice shown in Fig. 11, it is preferred that the metallic boundaries of the respective apertures occupy as small a portion of the total area as possible. The cross-sectional configuration of the apertures may be circular, rectangular or otherwise. If rectangular, the plate may be made as a grid comprising two sets of mutually perpendicular sheets of metal as in Fig. 12. For mean operating wave-lengths of the order of 1 centimeter, these sheets may be uniformly spaced about ½ centimeter apart and the axial length of the grid may be 2½ centimeters or greater. With these dimensions the reflection characteristic of the assemblage will exhibit a sharp discontinuity at an operating wave-length of about 1 centimeter. Other reflector markers may be designed to have the same sharp discontinuity at other wave-lengths within the operating range so that the several reflectors can be distinguished by varying the frequency of the scanning beam. Another possibility is to employ a transmitter producing heterogeneous radiation such as may be produced by a spark-gap and analyzing the reflected wave components as before.

Figure 13:
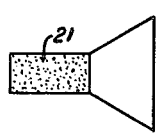
Figs. 13 to 15 show various forms of radio wave dissipators that may be used in conjunction with the reflectors.

Although for course marking purposes, the metallic horn has been described herein as a reflector, there are circumstances where better contrast with the background may be had if the horn is so terminated as to absorb all of the incident energy. If, for example, the horns are used to mark a fiord or a river surrounded by objects of high reflecting power, such as a high palisade of rocky material, the radio apparatus on the ship might be unable to distinguish reflection from the horn and reflection from the background, whereas it would be possible to distinguish the horn and background if the horn were designed as an absorber. Fig. 13 shows one of many modifications that can well be used in such circumstances, viz., a horn terminated in a metallic pipe containing power absorbing material 21. It will be evident that this absorber can be made frequency selective or otherwise modified as herein described to permit of identification.

Figure 14:
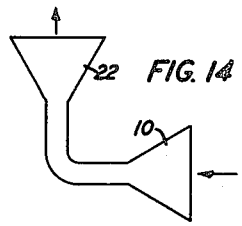

The quasi-absorber or dissipator of radio waves illustrated in Fig. 14 may be used in many cases in accordance with the invention where actual power absorption is not required. In such cases it is sufficient if the radio wave intercepted by the horn 10 be not reflected toward the source. The desired result is accomplished in Fig. 14 by guiding the intercepted radio wave through the horn 10 to another horn or radiator 22 that is so directed that the wave radiated from it cannot reach the source in any substantial degree. Thus where the combination is used as a channel marker for ships the radiation may be directed skyward as illustrated. In this case, also, provision can readily be made in accordance with applicant's teachings herein for identifying and distinguishing a plurality of such markers. It should be apparent that wherever a complete absorber is indicated in applicant's disclosure, a quasi-absorber utilizing the principles underlying Fig. 14 may be employed.

Figure 15:
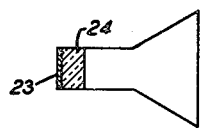

Another form of absorber is shown in Fig. 15. This one comprises a metallic pipe connected to the throat end of the horn and terminated in a metallic reflector plate 23 in combination with a dielectric core section 24 contiguous with the plate. The length of the dielectric core can be so correlated with the dielectric coefficient of the material comprising it and with the dimensions of the pipe that there is substantially complete absorption at a preassigned frequency or band of frequencies. At other frequencies the combination constitutes a reflector. More particularly, if a plane wave is incident more or less perpendicularly on a slab of low loss dielectric having a thickness of one-half wave-length, the slab will transmit a large part of the incident power, whereas if the thickness is a quarter wave-length much of the incident power will be reflected and the dielectric slab will behave as a mirror. If the dielectric material is dissipative, and backed with a perfect conducting surface, then the combination will operate as a complete absorber when the wave-length λ is equal to $$8\sqrt{\frac{K}{377\gamma}}$$

and the thickness of the slab is $$\frac{1}{188\gamma}$$

where K represents the dielectric constant of the material and γ its specific conductivity.

Figure 16:
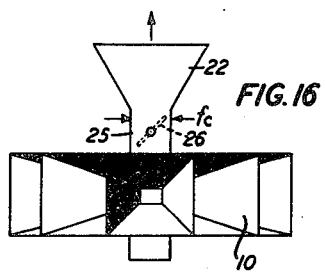
Figs. 16 to 18 illustrate arrays of reflectors with provision in accordance with the invention for frequency-selective reflection or modulation of an incident wave and for an auxiliary singaling service.

Inasmuch as a single horn has a limited angular range over which it is effective as a reflector, it is further proposed in accordance with the invention that a plurality of differently directed horns or reflector combinations, as described, be arranged to cover any desired angular range. In the illustative embodiment shown in Fig. 16, a plurality of horns of rectangular cross-section are arranged in a circular array so that a radio scanning beam arriving from any horizontal direction will be intercepted and reflected. Although the throat of each horn may be blocked off as in Fig. 3, it is preferred that they all open into a common pipe or chamber to facilitate application of means for identifying the particular reflector array. In Fig. 16, therefore, all of the horns open into a vertical pipe 25 which is closed at its lower end and which at its upper extremity is connected to a power absorber or quasi-absorber, viz., the upwardly directed horn 22. The manner of connection of the horns to the pipe 25 is fully indicated in Fig. 17. The pipe may be designed as described with reference to Fig. 10 to transmit to the absorber only frequencies in the operating range lying above a distinctive preassigned critical frequency $f_c$, or any of the other frequency-selective transmission devices described with reference to Figs. 6 to 12 may be employed for the purpose of identifying or distinguishing the several reflector arrays that might be employed in a channel marking system, for example.

At the upper end of the pipe 25 in Fig. 16 is represented a butterfly valve 26. This is an optional feature which permits the pipe to be closed off when and if it is desired to operate the array of horns as a simple reflector array. By providing automatic means for successively opening and closing the valve 26 in predetermined sequence, some or all of the frequency components of the incident scanning beam may have impressed on them an amplitude modulation in accordance with a telegraph code, for example, that can be interpreted on analysis of the reflected wave at the ship to identify the particular reflector marker. Other modifications of this general nature will be described hereinafter.

Figure 17:
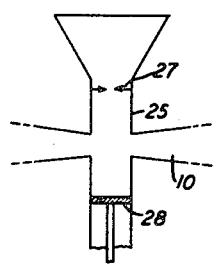

Fig. 17 shows a modification of Fig. 16 in which the vertical pipe 25 is or may be of diameter great enough to transmit all frequencies in the operating range and in which a frequency-selective function is introduced by providing an iris diaphragm 27 at the upper end of the pipe. The lower end of the pipe may have a metallic cap or a longitudinally adjustable reflecting piston 28. The chamber formed by the pipe, the iris diaphragm and the piston may be so proportioned as well understood in the art to be resonant at any desired frequency, and the relative point of connection of the array of horns longitudinally of the chamber may be so fixed that the array of horns is efficiently connected to the quasi-absorber for incoming waves of approximately the resonant frequency. Incoming waves of other frequencies are met with an impedance discontinuity and hence these waves are reflected toward their point of origin. A distinctive resonant frequency can be assigned to each of several arrays in accordance with Fig. 17 so that they may be identified from the passing ships.

It remains to be pointed out with reference to Figs. 16 and 17 that they are adaptable also to the performance of another function or the provision of an auxiliary service supplementary to that of channel marking and the like. First, suppose that the valve 26 of Fig. 16 or the iris diaphragm 27 of Fig. 17 is closed so that a metallically bounded chamber is formed through which all of the horns in the array are then interconnected. It may be supposed also without doing violence to the fundamental principles involved that the point of connection of the horns longitudinally of the chamber is substantially optimum for efficient intercoupling of the several horns. It is evident then that a radio beam entering any one of the horns will enter the chamber and be reradiated through all of the horns. If that beam be not a simple scanning wave but a beam modulated with intelligence bearing signals, it is further understandable that the signal modulated waves arriving in the form of a beam will be broadcast or reradiated more or less uniformly in all radial directions. It is therefore proposed to provide a supplementary service for the dissemination of storm warnings, weather, traffic reports and the like wherein such information is transmitted by radio beam from a conveniently located beam transmitter, perhaps miles away, to the reradiator array described from which it is then rebroadcast to all ships in the vicinity. Whereas the foregoing description might be understood as requiring some remotely controlled or automatic timing apparatus for closing the valve 26 or iris 27 in accordance with published schedules, such apparatus is not necessary if the auxiliary service described is provided on an assigned wave-length substantially different from the wave-length for which the array constitutes an absorber. Thus in Fig. 17 the combination has been described as being absorptive of radio power at a certain operating frequency, whereas at another frequency it may be highly efficient in rebroadcasting rather than absorbing the incident wave.

Figure 18:
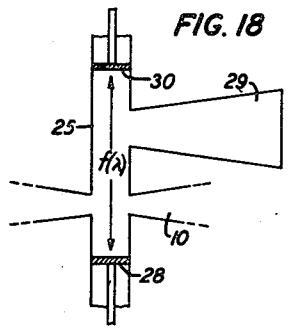

Fig. 18 shows an arrangement similar to those in Figs. 16 and 17 but with modifications more especially adapting it for the auxiliary service described. Below the circular array of horns connected to the vertical metallic pipe guide 25, is an adjustable piston 28. Above the array and also opening into the guide 25 is a single horn 29 which may be assumed to be directed toward the radio beam transmitter radiating the intelligence bearing signals. This horn may be comparatively large and of relatively high axial gain so that it may serve as a highly efficient radio wave collector, at least at the frequency of the intelligence bearing radio waves. A second piston 30 above the point of connecton of the throat of horn 29 to the guide 25 completes the assemblage. The position of the two pistons can then be so adjusted that the portion of guide between them is of optimum length for efficient electromagnetic coupling of the circular array of horns and the single horn 29. It is desirable also that the axial distance between the single horn and the array of horns be designed, in accordance with principles understood by those skilled in the art, to facilitate an impedance matching coupling.

The combination illustrated in Fig. 18, as hereinbefore described, will be understood as providing for efficient collection of radio waves of a predetermined frequency incident on the horn 29 and for rebroadcasting of the wave power so collected through the circular array of horns 10. It may be noted that the system is adapted also for two-way communication, for intelligence bearing radio beams directed at the circular array from nearby ships or other points in the vicinity will in greater or less degree be reradiated through the horn 29 to appropriate receiving apparatus at the distant station or central office. On moving the upper piston 30 downwardly, by automatic means or otherwise, to a position between the throat of the horns 10 and the throat of the horn 29, the combination reduces to essentially the combinations shown in Figs. 16 and 17 when in the latter the valve 26 and the diaphragm 27, respectively, are closed as previously described. The circular reflector array thus constituted has frequency-selective reflection properties determined principally by the distance between the two pistons. In this latter condition, the combination can be used also for relaying signals between ships if that be found preferable in given circumstances to direct intercommunication. For this purpose all that is required is that the transmitted radio beam signals from the one ship be directed toward the reflector array and that the radio receiving equipment of the other ship also be trained on the array.

The various embodiments of the invention hereinbefore described having means for identifying the particular reflector, involve with one exception noted in the discussion of Fig. 16 passive frequency-selective means requiring the transmission of a plurality of frequencies from the ship transmitter. The embodiments of the invention now to be described make it possible to use a single invariable frequency. These latter embodiments include means for impressing on the wave incident on the reflector some form of modulation. Figs. 19 to 24 relate to frequency or phase modulation.

In Fig. 19 there are represented two parallel metallic pipe guides 31 and 32 which merge into a common guide portion 33 that is terminated by a reflecting piston 34. Suppose that a pure sine wave of frequency $f$ and wave-length $\lambda$ is introduced into guide 31 and propagated from left to right so that on striking the piston 34 a substantial portion of the wave power is reflected into guide 32 and propagated therein from right to left. The frequency $f_1$ of the reflected wave will be the same as that of the incident wave and its wave-length $\lambda'$ will also be the same assuming that guides 31 and 32 have equal coefficients of phase velocity $c$. Suppose now that the piston 34 is advanced into or withdrawn from the guide portion 33, as by means of an electromagnetic device 35, at a constant velocity V. If the piston is advancing, it can be shown, the apparent wave-length $\lambda'$ of the reflected wave is $$\lambda' = \lambda\left(1 - \frac{2V}{c}\right) \quad (1)$$

To any device receiving the waves from guide 32 it appears that on moving the piston the waves have undergone a frequency change $\Delta f$, where $$\Delta f = \frac{2V}{c} \times f \quad (2)$$

If the piston on the other hand recedes at a velocity V, the apparent wave-length $\lambda''$ of the reflected wave is $$\lambda'' = \lambda\left(1 + \frac{2V}{c}\right) \quad (3)$$

and the relative change in wave frequency is the same as before, viz., as stated in Equation 2. If the piston moves back and forth in simple harmonic motion, $p$ times per second, the apparent frequency of the waves from guide 32 will be $$f'' = f\left(1 + \frac{2V}{c} \cos pt\right) \quad (4)$$

The equation of the reflected wave in this case is of the form of $i = A \sin \varphi$ and the frequency at any instant of time is expressible as $$\frac{1}{2\pi} \frac{d\phi}{dt}, \text{ where } \phi = \Phi + \int 2\pi f'' dt \quad (5)$$

Then $$\phi = \Phi + 2\pi f t + \frac{2V}{c} \frac{2\pi f}{p} \sin pt = \omega_0 t + \frac{2\omega V}{cp} \sin pt \quad (6)$$

where $$\omega_0 t = \Phi + \omega t$$

Substituting, the equation of the reflected wave becomes $$i = A \sin\left(\omega_0 t + \frac{2\omega V}{cp} \sin pt\right) \quad (7)$$

The term $$\frac{2\omega V}{cp}$$

corresponds to the so-called modulation index. It is the ratio of the maximum frequency swing, which in this case is $$\frac{2V}{c} \omega$$

to the modulation frequency $p$. The reflected wave is obviously frequency modulated and the modulation or "signal" is determined by the velocity of vibration of the piston 34, and the velocity in turn is controlled by the signal applied through device 35 or equivalent means. The signal may be, for example, an audio frequency "carrier" wave which is varied in amplitude in accordance with a telegraphic code or in accordance with a tone wave of fixed or varying low frequency. With appropriate refinement of apparatus and technique the signal may assume a more complex form such as that of a speech wave. In general, it may be said that the method described is best adapted to, but not limited to, operating wave-lengths below 10 centimeters.

Although the frequency modulation systems herein described are of general application in the communication art, they will henceforward be more particularly described in relation to their application to a course marking system such as outlined in Fig. 1. Accordingly, in Fig. 19 the two guides 31, 32 may lead to the left to a pair of like-directed metallic horns so that the combination is substantially equivalent to Fig. 5 with the addition of frequency modulating apparatus in the connecting guide to provide for identification of the reflector unit.

The piston-like action prescribed for element 34 in Fig. 19 may be successfully approximated in practice by the use of a flexible metallic diaphragm as in Figs. 21 and 22. Fig. 20, however, illustrates a preferred modification in which the velocity of a moving element controlled by the signal and operating to produce frequency modulation is effectively multiplied several times over. In accordance with this modification, use is made of the relation between the transverse dimension of a hollow pipe guide and the transmission cut-off frequency of the guide. More particularly the common guide portion 33, preferably of rectangular cross-section, into which the respective guides 31 and 32 merge as in Fig. 19, is made with a gradual taper to the right so that the transverse dimension controlling transmission cut-off is gradually reduced. For a wave of any given frequency entering the tapered portion from guide 31, a point will be reached where the transverse dimension of the tapered guide is too small for the wave to progress farther. In other words the transverse dimension at that point is such that the cut-off frequency approximately coincides with the frequency of the applied wave. Inasmuch as the wave cannot advance beyond the point specified, it is reflected, and as in Fig. 19 at least a substantial portion of the reflected wave escapes through guide 32.

Suppose such a reflection point thus established is at 36 in Fig. 20 and suppose further that one of the four side walls of the tapered section is pushed in or pulled out in the vicinity of the point 36 to change the transverse dimension that is normal to the lines of electromotive force in the wave, that is, the transverse dimension that controls cut-off for guided waves of the assumed $H_{11}$ type. If the side wall is moved outwardly, the wave will now progress beyond the point 36 before reaching a point where the transverse dimension is too small to permit further advance of the wave, and if the side wall is moved inwardly the wave will reach such a reflection point before the point 36 is encountered. It should be evident that a virtual piston is thus provided and that its longitudinal position is controllable by movement of the side wall. The more gradual the taper of the guide portion 33, the greater is the displacement of the virtual piston for a given displacement of the side wall, and a velocity of movement of the virtual piston that is much greater than the velocity of displacement of the mechanical element, the side wall, is thereby obtainable. In accordance with this phase of the invention the movement of the side wall is controlled by the signal, as by means of a device 35, in substantially the same manner and for the same ultimate purpose as applies to the device 35 in Fig. 19. Various mechanical and electrical arrangements for effecting the displacement of the side wall in the tapering section will be evident to those skilled in the art, and one illustrative apparatus will be described hereinafter with reference to Figs. 26 and 27.

Although separate wave guiding passages for the incoming modulated wave and the outgoing frequency modulated wave have been provided in Figs. 19 and 20, this arrangement is by no means essential for a reflector marker system, and the waves throughout may traverse a common wave guiding path. In Fig. 21, for example the throat of the reflector horn 10 is simply terminated in a short section of hollow pipe guide closed at the end by a movable piston. The piston is actually in the form of a flexible metallic diaphragm 40. The details of the diaphragm mounting may be as illustrated in Fig. 22, where a circular diaphragm 40 is mounted concentrically with a rigid annular metallic plate 41 and attached thereto by a plurality of elastic radial fingers 42. To set the diaphragm into high velocity oscillation, it may be struck a blow intermittently as by means of a pendulum 43 in Fig. 21. The striking mechanism may be operated simply by the rocking of a floating reflector or by compressed air, a spring motor or the like, and successive blows may be so timed as to produce a telegraphic code symbol. It will be understood that the signal thus impressed by frequency modulation on the intercepted wave comprises a plurality of damped wave impulses.

The mechanical vibrations of a piezoelectric crystal that is electrically excited may be used to produce the high velocity movement desired for frequency modulation in accordance with the invention. One embodiment is illustrated in Fig. 23, which is substantially the same as Fig. 21 except for replacement of the striker of the latter figure by a piezoelectric crystal drive. The crystal 44 is mounted between and in mechanical contact with the diaphragm 40 on the one hand and a back plate 45 on the other so that its expansion and contraction in the direction of the axis of the horn causes corresponding displacement of the diaphragm 40. Electrical excitation for the crystal is provided by connection from suitable crystal electrodes to an alternating current source 46. The crystal is preferably resonant at the frequency of the waves from source 46 and the latter frequency may be, for specific example, of the order of 40,000 cycles per second. The latter frequency too will suffice to identify the particular reflector marker in a channel marking system or the like, but the crystal may alternatively be excited with waves bearing a telegraphic or tone modulation. It will be evident that the crystal type of drive illustrated in Fig. 23 may be applied also to other structures, such as the one illustrated in Fig. 20, and that with the crystal so applied the combination can be used as a radio transmitter. In the latter case, the signal current, which may correspond to speech waves or other complex signal, may be applied either directly to the excitation of the crystal or in the form of a carrier wave of 40,000 cycles per second, for example, with the complex signal amplitude modulated thereon. The manner of constructing and proportioning the combination to perform the inverse function, viz., radio reception, should be obvious to those skilled in the art from the foregoing description of the transmitter modification.

The embodiment shown in Fig. 24 may be readily compared with that of Fig. 21. In this construction the throat of the horn is closed with a flexible diaphragm 48 which may be mechanically arranged as in Fig. 22 and which is of magnetic material. The electromagnet 35, traversed by direct current interrupted at high frequency by means symbolically represented by the contactor 49, alternately attracts and releases the diaphragm 48 to establish corresponding high velocity movement thereof and consequent frequency modulation of the waves intercepted by the horn.

Attention is directed now to an example of the invention in accordance with which amplitude modulation of an incident wave is effected rather than frequency modulation. As illustrated in Fig. 25 this typical embodiment comprises a horn 10 connected to the wave power absorbing chamber 16 through a hollow pipe guide 50 that is preferably of rectangular cross-section. Assuming that the scanning beam directed at the horn 10 from a passing ship is a wave of substantially fixed single frequency, the transverse dimensions of the guide 50 are so proportioned, following the principles discussed with reference to Fig. 20 that the transmission cut-off frequency of the guide is slightly greater than the frequency of the scanning wave. Otherwise stated, the actual transverse dimension of the guide is, for a wave of the frequency assumed, somewhat less than the critical dimension. In these circumstances, the incident wave cannot be propagated to the guide 50 and it is accordingly reflected through the horn toward its origin. One side wall of the guide 50 is made flexible so that it can be moved laterally just as in the case of the side wall in Fig. 20. On moving the wall outwardly the significant transverse dimension of the guide becomes greater than the critical dimension, hence the incident waves are transmitted through the guide 50 to the chamber 16 and there absorbed. The movement again may conform to a telegraphic code symbol so that the particular reflector marker can be identified by the sequence of pulses produced at the ship on reception of the reflected beam. As shown in Fig. 25 at least one wall of the guide may be made of magnetic material and its movement controlled by an electromagnet 35. It is to be observed that the combination shown in Fig. 25 is adaptable for use as a radio transmitter by replacing the absorber 16 with means for launching a carrier wave in the guide 50.

If variable control of the transverse dimensions of a portion of guide is desired, as in Figs. 20 and 25, for example where such control is utilized to vary the transmission cut-off frequency, the structure of the guide portion may embody the principles involved in the structure shown in Figs. 26 and 27. This structure is intended more especially for an arrangement such as shown in Fig. 20 where there is not through transmission in the guide portion and where it is possible therefore to obstruct one end of the guide portion. The guide portion in Fig. 26 is of rectangular cross-section and it is tapered from the end connected with the incoming guide 33 to its other end which is closed by a plate 51. Two of the supporting walls 52 and 53 are perforated with fine holes, which may be for specific example of the order of a millimeter in diameter, and along but spaced from the inner faces thereof there is stretched a pair of metallic ribbons 54 and 55, respectively, which from an electrical standpoint function as side walls of the guide. At one end the ribbons are attached to the walls 52 and 53. At the other end the ribbons are attached to opposite edges of a rectangular plate 56 that is disposed just within the end plate 51 and which is restrained from moving in one direction by the posts 57. These posts serve as fulcrums so that on advancing or retracting the screw 58 in the end plate 51, the tensioning of the ribbons can be adjusted. By way of specific example, the ribbon may be of foil 0.010 millimeter in thickness made of duralumin or other special alloy and spaced 0.01 millimeter from the side walls 52, 53. If the ribbons are to be vibrated by electromagnetic means, the ribbon material, of course, must be magnetic, although this restriction is removed if the ribbons are controlled by fluid pressure or mechanical means operating through the apertures in the side walls 52, 53.

Other forms of reflector markers utilizing amplitude modulation for identification purposes are illustrated in Figs. 28 to 30. In Fig. 28, the combination comprises in addition to the horn 10, a section of pipe guide 15 connected to the throat end thereof and a piston 60 longitudinally movable within the pipe 15. On slow movement of the piston backward and forward, the distant receiver on the ship experiences a series of maxima and minima which on appropriate movement of the piston 60 may assume a telegraphic code sequence to identify the particular reflector. In Fig. 29 an iris diaphragm 61 is added at the throat end of the horn so that a chamber is formed, the resonant frequency of which can be varied by adjusting piston 60. The degree of reflection from the combination depends on the position of the piston, and again by appropriate movement of the piston the efficiency of reflection can be varied with time in a manner individual to the particular reflector. The arrangement shown in Fig. 30 is the same as that illustrated in Fig. 29 except for the addition of a resistance film 62 on the inner surface of the pipe section 15 whereby on movement of piston 60 the efficiency of reflection can be varied from a high value such as may be obtained in Fig. 29 to a lower value than can be obtained with the Fig. 29 arrangement.

Although the radio apparatus on the ship has been illustrated in Fig. 2 as comprising simple metallic horns for the transmitter and receiver, they have been so indicated only for simplicity of illustration. In practice, it is likely that in many cases it will be desirable to provide greater gain than can be realized with a single horn, especially in view of the great loss of energy incident to transmission of waves to a reflector and reception of such reflected waves as reach the receiver. Various refinements in the design of single horns and compact radiator and receiver arrays are illustrated in Figs. 31 to 42, which will now be described.

To secure a more even distribution of the lines of electric force at the mouth of a horn of rectangular cross-section, and thereby to increase the axial gain of the horn, the upper and lower faces of the horn may be extended as illustrated in Fig. 31 to provide extensions 63 and 64, the planes of which are both perpendicular to the lines of electromotive intensity of the waves traversing the horn. Fig. 32 shows a modification in which the lateral walls of the horn are notched at the mouth for the same purpose. Where a plurality of horns of rectangular cross-section are to be arrayed as in Fig. 33, the effect of notching as at Fig. 32 may be obtained effectively in the manner illustrated in Fig. 34; that is, the vertical sides of the horn carry longitudinal notched extensions 65 which lie in registry with similar extensions from adjacent horns when arrayed as in Fig. 33. It may very well be that in an array of horns such as disclosed in Fig. 33, the lateral walls need be carried but a very short distance. Thereafter only the top and bottom boundaries are in evidence and the wave proceeds as though it were in one large horn.

Fig. 35 shows another form of array which may be used for radiation or reception with high gain and directivity. This array is made up of a row of metallic open-ended boxes 66 or sections of wave guide of rectangular cross-section all of which are connected by end openings to an elongated cross chamber 67 also of rectangular cross-section. Branching from the mid-point of the latter chamber is a wave guide 68 which may lead to a wave source or receiver. Supposing that the array is to be used for purposes of radiation as indicated by the arrows, it may be explained that waves delivered from the guide 68 are transmitted longitudinally through the chamber 67 and the wave power is thereby distributed to the several units 66. If the spacing between the end openings in the several units is made one full wave-length, the waves issuing from the open ends of the units 66 will coalesce in phase to form a substantially plane wave front. If the spacing between units is to be other than a full wave-length, then the arrangement to be described with reference to Fig. 36 may be employed to produce the desired high gain and directivity.

In Fig. 36 there is shown an array comprising open-ended rectangular units 69 arranged in a row as in Fig. 35, which in this case, however, open off the side wall of a wave guide 70 which may be short-circuited or otherwise closed at the remote end. Whatever the spacing of the apertures at the rear end of the units may be, as for specific example a half wave-length, the transverse dimensions of the units may be so proportioned that the waves issuing from the open end are in phase. The longer transverse dimension $b$ of each unit 69 controls the phase velocity thereof assuming the electric field of the passing wave is perpendicular to the wider face of the unit. Alternate units in the row therefore may be assigned a different transverse dimension $b'$ such that the electrical length of those units differs from that of the others by a half wave-length or whatever may be necessary in the particular case to insure that the waves issue in phase.

Fig. 37 represents a modification of Fig. 35 in which the rectangular units 66 are replaced by a row of metallically defined triangular prisms 71 spaced apart and mounted on the lower plate 72 of the array. The upper plate is not shown. This construction provides a plurality of horn-like radiators of rectangular cross-section defined by adjacent prisms 71 and the two cover plates. The spacing of the apertures between the prisms may be proportioned in accordance with the principles described with reference to Figs. 35 and 36.

The array shown in Fig. 38 bears relation to Fig. 36 in that the units are connected to one side of a pipe guide 70, and it is similar to Fig. 37 in that the units are in the form of horns of rectangular cross-section. The principal advantage of the structure shown in Fig. 38 lies in the simplicity and ease with which it can be constructed, for the horns can be formed by a single long metallic strip 73 which is apertured and bent as illustrated and disposed between upper and lower plates 72. An aperture 74 is provided at the throat end of each horn so defined.

Figure 41:
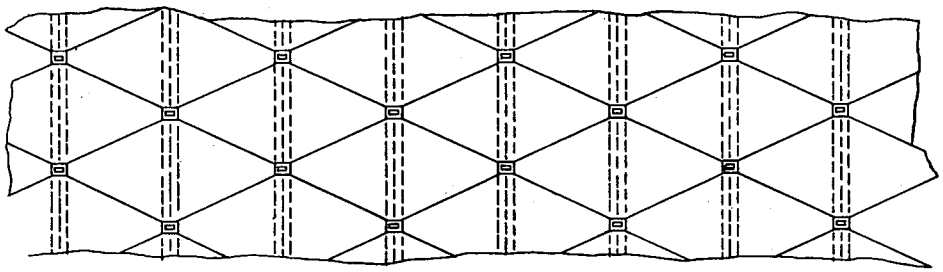
Figure 40:
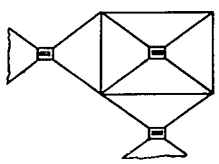
Figure 39:
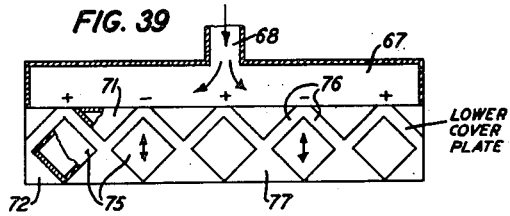

Fig. 39 represents a modification of Fig. 37 in which means are added for adjusting the relative phases of the waves issuing through the separate apertures. The adjusting means takes the form of metallic prisms 75, of rectangular or other suitable cross-section depending on the shape of the elements 71, which are arranged between elements 71 to form passageways 76 and a row of horn-like openings 77. By advancing or retracting the units 75 the phase in which the waves issue through the horns 77 may be controlled. Thus, the spacing of the apertures in the chamber 67 may bear any desired relation to the wave-length and compensation can be made by adjusting the units 75 to insure that the waves issuing are in phase or that waves received are effectively converged on the guide 68. Automatic elements for adjusting the units 75 with changes in operating wave-length may be provided if desired.

Where greater gains are desired than are obtainable with a single row of horns, the horns may be arranged in both horizontal and vertical array as indicated schematically in Fig. 40. Substantial economies in time and material are possible in the construction of these horns. To form the vertical walls and throat ends of the horns, sheet material may be cut in the manner indicated by the solid lines in Fig. 41 and bent along the dotted lines. Each horizontal row of diamond-shaped portions forms the vertical portions of one horizontal row of horns. Other sheet material may be cut and bent in the same general configuration so that each horizontal row of diamond-shaped portions forms the top and bottom surfaces for a vertical row of horns. The dotted lines in Fig. 41 provide for the bending and flattening of certain portions of the material to form the interhorn extensions illustrated in Fig. 38.

Figure 42:
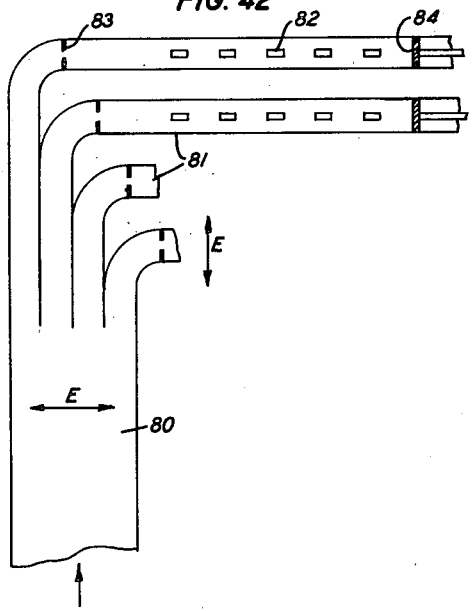

To feed or excite an array of horns such as represented in Fig. 40 or to receive the waves intercepted by the array of horns, a wave guiding system such as shown in Fig. 42 may be employed. A vertical wave guide 80 of rectangular cross-section is divided at its upper extremity into a plurality of smaller branch guides 81, which are arrayed one above the other horizontally in the same vertical plane. Openings 82 are made in the walls of the several branch guides and to them the throats of the several horns are connected. The spacings of the openings should be proportioned with a view to the operating wave-length, and an iris diaphragm 83 and an adjustable piston 84 in each guide may be further adjusted to facilitate efficient interchange of energy between the several horns and the connected wave guides. For best results the electric field should be polarized in the manner represented by the arrows. Preferably the distances from the point of subdivision to guide 80 to the several irises 83 should be the same or differ from each other by an integral number of wave-lengths.

Figure 43:
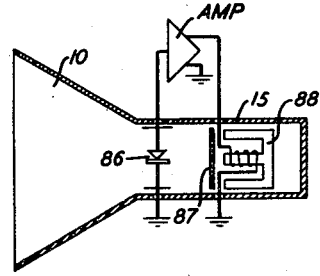
Figs. 43 and 44 show combined radio and acoustic wave devices of which the first is adapted for use as a radio wave receiver.

The combined electromagnetic and acoustic system shown in Fig. 43 may be applied to advantage to the radio receiving equipment herein specified. In this system, the same horn 10 serves for both the receipt of electromagnetic waves and the radiation of acoustic waves. Other passages in the system serve to guide both types of waves simultaneously, and elements of the acoustic portions of the system may serve also electrical functions for the electromagnetic waves. More particularly, incoming electromagnetic waves modulated with an audio frequency signal and intercepted by the horn 10 are impressed on a suitable pick-up and rectifier 86 that is disposed at the throat of the horn or in proximity thereto in the metallic pipe guide 15 coupled to the throat of the horn. The audio frequency component thus derived is withdrawn from the guide and applied to an amplifier AMP. The amplified signal is then applied to the field winding of an electro-acoustic transducer comprising core member 88 and a magnetic diaphragm 87 so arranged in the pipe 15 that the acoustic vibrations produced by the diaphragm are transmitted out through the horn 10. For efficient operation of the detector 86, it is desirable that a reflector be spaced a quarter wave-length beyond it; the diaphragm 87 may be proportioned and spaced to perform this reflector function. So far as its electrical function is concerned the horn 10 may be of ordinary sheet metal. However, for optimum acoustic performance this may not be as desirable as wood or fiber. A satisfactory compromise can be reached by constructing the horn of material suitable from an acoustical standpoint and coating the interior thereof with metal foil or sprayed metal or metallized paint for example.

Whereas the structure illustrated in Fig. 43 is described as being adapted to receive modulated radio waves and to produce audio frequency or other comparatively low frequency acoustic waves, which latter serve to indicate the presence or identity of a course marker in a radio reflector marker system, the structure obviously has other uses. It may be observed too that the process involved in the operation of the structure may be reversed with slight modification of the apparatus, that is, the combination may be used for picking up acoustic waves and radiating correspondingly modulated electromagnetic waves.

Figure 44:
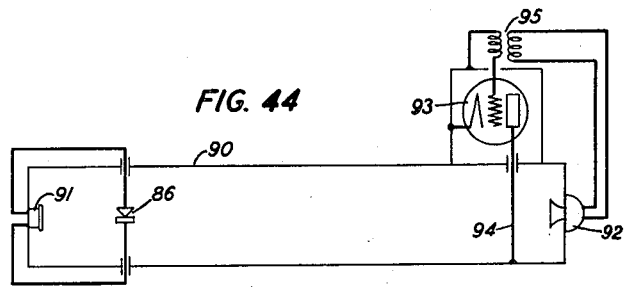

In further exposition of the principles underlying the construction and operation of the Fig. 43 system, reference is now made to Fig. 44 and the oscillatory or regenerative electro-acoustic combination therein disclosed. Although the frequency of electromagnetic waves in the centimeter wave-length range may be of the order of a million times any acoustic frequency, the acoustic and electrical wave-lengths may be quite comparable. It will be understood, therefore, that where electromagnetic waves and acoustic waves traverse or occupy the same passage or cavity the relative wave-lengths of the two types of waves may be so adjusted that resonance effects in the passage or cavity are obtained for both types of waves at once.

In Fig. 44 an elongated chamber 90, shown in longitudinal section, is provided by a metallic pipe of rectangular cross-section closed at each end by a metallic plate. On one of the end plates is mounted a telephone receiver 91 or equivalent device operative to convert electric currents into corresponding acoustic waves in the chamber 90. On the other end plate is mounted a telephone transmitter 92 or equivalent device adapted to receive sound waves from chamber 90 and to translate them into corresponding electric currents. An oscillator comprising a three-electrode discharge device 93 is mounted at the end of the pipe nearest the transmitter 92 with a lead from an output electrode thereof extending into and diametrically across the interior of the pipe as conductor 94. The latter conductor is adapted to launch guided electromagnetic waves in the chamber 90 and it is preferably to be placed approximately a quarter wave-length from the proximate end plate. At the other end of the pipe and spaced approximately a quarter of the electromagnetic wave-length from the end place is a detector or rectifier 86 connected by diametral leads aligned with conductor 94 to the terminals of the telephone receiver 91. The length of the chamber 90, that is, the distance between the two end plates, is to be adjusted to approximately an integral number of half wave-lengths to establish resonance for the electromagnetic waves. Under the conditions outlined oscillations are generated, the frequency of which is wholly or in part dependent upon the spacing of the end plates.

The intercoupling of the electrical and acoustical system in Fig. 44 is completed by a connection from the telephone transmitter 92 to a control circuit of the oscillator, as by means of a transformer 95, one winding of which is connected in the grid circuit of the discharge device 93. Electric currents produced by the transmitter 92 then operate to modulate the oscillations produced by the discharge device. At one or more frequencies determined by the spacing of the end plates of chamber 90 the system is resonant for acoustic waves. Self-sustaining acoustic oscillations may be produced in the following manner: An acoustic wave in the chamber impinging on transmitter 92 establishes corresponding currents in the electrical circuit connected thereto which operate to modulate the electromagnetic oscillations produced by the discharge device 93. These modulated oscillations are received in guided wave form at the detector 86 which operates to recover the modulating wave as a corresponding electric current which is then applied to the telephone receiver 91. Corresponding acoustic waves are generated by the receiver 91 and these traverse the chamber 90 and are subject to the acoustic resonance thereof. These acoustic waves in turn are received at the telephone transmitter 92, and the cycle is repeated indefinitely.

In each case disclosed herein where a simple horn having a linear rate of flare is prescribed, as for example the conical horn of circular cross-section, the sectoral horn and the pyramidal horn of rectangular cross-section, the horn may be designed in accordance with principles disclosed heretofore for maximum axial gain. Alternatively, however, the horn may be designed for maximum efficiency rather than maximum gain, in accordance with the principles now to be described. The two types of design are no nearly compatible with each other that from a practical standpoint both maximum efficiency and maximum axial gain may be realized in one and the same form. Although a horn of rectangular cross-section has been chosen for purposes of exposition it will be evident that the principles involved are applicable also to horns of other cross-sectional configuration.

For maximum efficiency it is desired that there be no impedance discontinuity at the throat end of the horn nor at any point within the horn nor at the mouth where a coupling with free space is involved. The impedance at any point within the horn and at its extremities is dependent on the transverse proportions of the horn, whereas the impedance of free space is, of course, invariable and may be assumed to have a value of 377 ohms. Although there is more than one theory for the characteristic impedance of a hollow metal pipe guide, I have found that the appropriate formula in the present case is one in which characteristic impedance is defined in terms of power and equivalent current squared, which for a guide of rectangular cross-section is as follows:

$$Z = \frac{465a}{b\sqrt{1-\left(\frac{\lambda}{2b}\right)^2}} = \frac{930a}{\sqrt{4b^2\lambda^2}} \quad (8)$$

where $a$ is the transverse dimension parallel with the electric field of the assumed $H_{11}$ wave and $b$ is the transverse dimension normal to the electric field, and $\lambda$ is the free space wave-length measured in centimeters. If the mouth of the horn is considered to be the equivalent of a small wave guide of the same transverse proportions, such values for $a$ and $b$ can be ascertained as will make the characteristic impedance of the mouth equal to that of free space, viz., 377 ohms. Accordingly, Equation 8 is equated to 377 and an expression for $b$ obtained.

$$b = \sqrt{1.520a^2 + \frac{\lambda^2}{4}} \quad (9)$$

Figure 45:
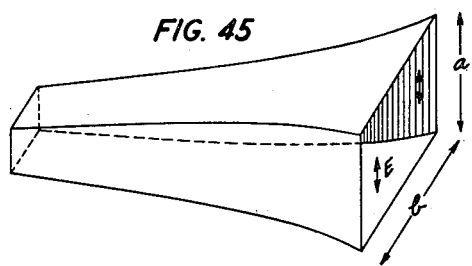
Figs. 45 to 47 relate to the design of electrically smooth horns and a terminating wedge.

Equation 9 can now be solved for any given value of $\lambda$ to yield the relative values of $b$ and $a$ for the mouth of the horn. Thus, if $\lambda$ is 10 centimeters, the optimum ratio of $b/a$ for a large horn is found to be 1.233. If, then, either mouth dimension $a$ or $b$ be specified the other dimension is determined. Similarly, at the throat end of the horn and at every point along the horn, the relative dimensions dictated by Equation 9 are to be observed. So also if a guide be connected to the throat end of the horn the relative transverse dimensions should be such, in accordance with Equation 9, that the characteristic impedance is 377 ohms. Inasmuch as the proportions so ascertained fix only the relative transverse dimensions, it remains to be considered how the transverse dimension shall vary along the length of the horn. One possibility as illustrated in Fig. 45 is to let the dimension $a$ vary linearly with length and at each point determine the appropriate value of $b$ from Equation 9. Alternatively, $b$ could be made a linear function of length and the dimension $a$ varied non-linearly. Alternatively, both $a$ and $b$ could be varied non-linearly with length, maintaining the proportions specified.

Figure 46:
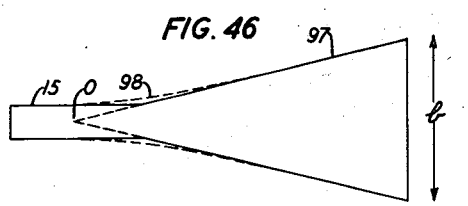

It is to be understood that each of the reflector horns herein disclosed may be designed in accordance with the foregoing principles so that it is electrically smooth and substantially free of internal reflection losses.

Where it is desired to realize substantially maximum gain and maximum efficiency in the same horn of rectangular cross-section, it is to be observed that for large values of $a$, as compared with $\lambda$, Equation 9 indicates a constant proportion between $a$ and $b$. In other words, towards the mouth of the horn the flare approaches a linear rate. As indicated in Fig. 46, this portion 97 of the horn may therefore be designed in accordance with the formula for a horn of maximum axial gain and the throat portion 98 may be modified in accordance with Equation 9 to improve the efficiency. The design procedure in a specific case might be as follows: The first step is to design, say, a pyramidal horn of rectangular cross-section having a vertex $o$ and a given axial length, to yield maximum axial gain. This fixes dimensions $a$ and $b$ and it will be found that the ratio $b/a$ is 1.233, that is, the value hereinabove shown to result in a characteristic impedance of 377 ohms. The absolute values of the transverse dimensions of the rectangular guide 15 connected to the throat of the horn are then to be determined in conformity with Equation 9. Thus, if the operating free space wave-length is to be 10 centimeters, for example, the guide 15 might appropriately have a dimension $a$ of 4 centimeters and a dimension $b$ of 7 centimeters. Equation 9 is next to be applied to the portion of horn between guide 15 and horn portion 97, preferably leaving dimension $a$ as fixed by the preceding design for maximum gain. The calculated values of $b$ for this intermediate portion 98 then will be found to dictate a gradual transition from the guide to the portion 97, the curve merging asymptotically into the sides of the portion 97.

Figure 47:
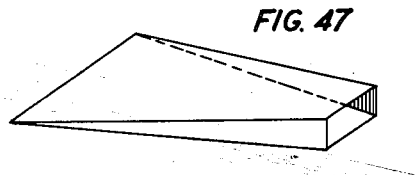

The principles discussed with reference to Figs. 45 and 46 may be further extended to the design of an impedance matching energy absorbing termination for a horn or guide. In the example shown in Fig. 47, the termination is in the form of a hollow metallic wedge which is open at one end for connection to the horn or guide to be terminated and which narrows to a line closure at the other. The transverse dimensions at the open end of the wedge are those of the guide or horn connected thereto. If the characteristic impedance at the point of connection is 377 ohms, Equation 9 may be applied directly to ascertain the proper relative transverse dimensions at any point of the wedge. If the characteristic impedance is other than 377 ohms then Equation 8 is equated to the value of impedance obtaining and the relative proportions are then determined by solution of that equation in the manner of derivation of Equation 9. It will readily be seen from Equation 9 that if the wedge is to terminate a structure having a characteristic impedance of 377 ohms, the length of the wedge at the closed end will be one-half wave-length.

Although the invention has been described with reference to various illustrative embodiments, it will be understood that the invention is susceptible to various other embodiments within the spirit and scope of the appended claims.

What is claimed is:

1. A course marking system comprising a plurality of radio reflectors geographically spaced apart to outline a course, a vehicle having a transmitter for launching radio waves of a plurality of frequencies toward said reflectors, and means adjacent said transmitter for receiving the radio waves returned from said reflectors, said reflectors having respectively different frequency-reflection characteristics whereby they may be severally identified by the character of the waves returned to said receiver.

2. A system in accordance with claim 1 in which each of said reflectors comprises a metallic horn.

3. In a radio reflector marker system, a plurality of radio wave reflectors having mutually distinct frequency-reflection characteristics whereby they may be identified at a distance by their different reflecting effects on incident radio waves, each of said reflectors comprising a metallic horn, a dissipative termination for said horn and frequency-selective means controlling wave transmission from said horn to said termination.

4. A course marking system or the like comprising a plurality of directive metallic horns geographically spaced apart, a vehicle having means for transmitting radio waves of a plurality of different frequencies within a given operating frequency range and means for receiving the said radio waves incident on and reflected by said horns, said horns having substantially unlike frequency-reflection characteristics within said operating frequency range, at least one of said horns comprising means for dissipating radio wave power intercepted by said horn so that said power is not returned toward said vehicle, and frequency discriminative means connecting said horn and said dissipating means, said last-mentioned means having a distinct discriminating effect on different frequencies within said operating range whereby some frequency components of said incident waves are directed toward said receiving means and other frequency components are transmitted to and dissipated by said dissipating means.

5. A combination in accordance with claim 4 in which said frequency discriminative means comprises a hollow metal pipe guide, the transmission cut-off frequency of which lies within said operating frequency range.

6. A combination in accordance with claim 4 in which said dissipating means comprises means for directing wave power admitted thereto in a direction other than toward said receiving means.

7. A combination in accordance with claim 4 in which said frequency discriminative means comprises a metallically bounded cavity that is resonant within said operating frequency range.

8. An array of directive metallic horns the principal axes of which are differently oriented, a radio wave power dissipator, and a common connection from the smaller ends of all of said horns to said dissipator, said common connection having a frequency-selective transmission characteristic such that some frequency components of radio waves incident on said horn are transmitted to said dissipator and others are reflected.

9. An array of directive metallic horns aimed in different directions in the same horizontal plane, a metallically bounded resonant chamber, the smaller ends of said horns being connected in energy transfer relation with said chamber, another horn of relatively high axial gain aimed in another direction and connected at its smaller end in energy transfer relation with said chamber so that said other horn and said array of horns are electrically coupled together.

10. A hollow metallic wave guiding passage for electromagnetic waves, said passage flaring from one end thereof to the other, and the transverse dimensions of said passage being so proportioned that at every point along the length of said passage the impedance presented to waves guided therethrough is substantially the same.

11. In combination, a hollow metal pipe guide for high frequency electromagnetic waves, and a metallic horn surmounting an open end of said pipe, the transverse dimensions of said guide and said horn being so proportioned that the characteristic impedance of each is substantially the same as that of free space, whereby reflection losses incident to the interconversion of waves in said pipe and radio waves are substantially reduced.

12. In combination, a hollow metal pipe guide, and metallic surface means constituting a radio antenna extending therefrom, the characteristic impedance of said guide being equal to that of free space.

GEORGE C. SOUTHWORTH.

REFERENCES CITED

The following references are of record in the file of this patent:

UNITED STATES PATENTS

| Number | Name | Date |
| --- | --- | --- |
| 350,608 | Della Torre | Oct. 12, 1886 |
| 1,384,014 | Fessenden | July 5, 1921 |
| 2,106,768 | Southworth | Feb. 1, 1938 |
| 2,151,118 | King et al. | Mar. 21, 1939 |
| 2,159,937 | Zworykin | May 23, 1939 |
| 2,202,380 | Hollmann | May 28, 1940 |
| 2,212,110 | Beuermann | Aug. 20, 1940 |

FOREIGN PATENTS

| Number | Country | Date |
| --- | --- | --- |
| 466,063 | Great Britain | May 21, 1937 |
| 825,438 | France | Dec. 8, 1937 |